United States Patent
Elhart (12)

(10) Patent No.: US 11,920,363 B2
(45) Date of Patent: Mar. 5, 2024

(54) COLLAPSIBLE HUNTING BLIND APPARATUS

(71) Applicant: Thomas Elhart, Grand Haven, MI (US)

(72) Inventor: Thomas Elhart, Grand Haven, MI (US)

(73) Assignee: Thomas Elhart, Grand Haven, MI (US)

( * ) Notice: Subject to any disclaimer, the term of this patent is extended or adjusted under 35 U.S.C. 154(b) by 267 days.

(21) Appl. No.: 17/353,650

(22) Filed: Jun. 21, 2021

(65) Prior Publication Data

US 2021/0396036 A1  Dec. 23, 2021

Related U.S. Application Data

(60) Provisional application No. 63/041,803, filed on Jun. 19, 2020.

(51) Int. Cl.

| | |
|---|---|
| *E04H 15/00* | (2006.01) |
| *A01M 31/02* | (2006.01) |
| *B60D 1/66* | (2006.01) |
| *B62D 63/06* | (2006.01) |
| *B62D 63/08* | (2006.01) |
| *E04B 1/344* | (2006.01) |
| *E04B 1/343* | (2006.01) |

(52) U.S. Cl.
CPC ......... *E04H 15/008* (2013.01); *A01M 31/025* (2013.01); *B60D 1/66* (2013.01); *B62D 63/061* (2013.01); *B62D 63/064* (2013.01); *B62D 63/08* (2013.01); *E04B 1/3445* (2013.01); *E04H 15/001* (2013.01); *E04B 1/34317* (2023.08)

(58) Field of Classification Search
CPC .. E04H 15/008; E04H 15/001; A01M 31/025; B60D 1/66; B62D 63/061; B62D 63/064; B62D 63/08; E04B 1/3445; E04B 2001/34389
See application file for complete search history.

(56) References Cited

U.S. PATENT DOCUMENTS

| | | | | |
|---|---|---|---|---|
| 5,121,710 A | * | 6/1992 | Gonzalez | A01K 1/033 |
| | | | | 119/498 |
| 5,398,465 A | * | 3/1995 | Tagg | E04H 1/1216 |
| | | | | 49/386 |
| 5,493,818 A | * | 2/1996 | Wilson | E04B 1/3445 |
| | | | | 52/79.5 |
| 6,009,673 A | * | 1/2000 | Adams | E04H 1/1205 |
| | | | | 135/901 |

(Continued)

FOREIGN PATENT DOCUMENTS

| | | | | |
|---|---|---|---|---|
| EP | 0565497 B1 | * | 7/1997 | |
| EP | 3155900 A1 | * | 4/2017 | ............ A01M 31/02 |

(Continued)

*Primary Examiner* — Jacob B Meyer
(74) *Attorney, Agent, or Firm* — The Watson IP Group, PLC; Jovan N. Jovanovic

(57) ABSTRACT

A collapsible hunting blind apparatus comprises a floor member, a roof member, and a plurality of walls. The roof member includes angled surfaces and side walls coupled to the angled surfaces. The plurality of walls are hingedly couplable to the floor member such that the plurality of walls hingedly fold inward toward opposite walls and atop the floor member. The roof member is couplable to the floor member while the plurality of walls are folded atop the floor member.

20 Claims, 11 Drawing Sheets

(56) References Cited

U.S. PATENT DOCUMENTS

| | | | | |
|---|---|---|---|---|
| 6,017,081 | A * | 1/2000 | Colby | B60P 3/341 |
| | | | | 296/168 |
| 6,115,971 | A * | 9/2000 | Loebertmann | E04H 1/1216 |
| | | | | 4/449 |
| 6,892,497 | B2 * | 5/2005 | Moon | E04B 1/34321 |
| | | | | 52/270 |
| 7,395,634 | B2 * | 7/2008 | Anderson | E04H 1/1205 |
| | | | | 52/270 |
| 7,543,411 | B2 * | 6/2009 | Whitehead | E04B 1/34321 |
| | | | | 52/66 |
| 7,614,415 | B1 * | 11/2009 | Wehner | A01G 9/16 |
| | | | | 135/126 |
| 8,444,174 | B1 * | 5/2013 | Miller, Jr. | E04H 15/001 |
| | | | | 182/63.1 |
| 8,511,001 | B2 * | 8/2013 | Uffner | E04B 1/34321 |
| | | | | 52/72 |
| 9,765,542 | B1 * | 9/2017 | Broughton | E04H 1/1216 |
| 10,077,574 | B1 * | 9/2018 | Currid | B60P 3/38 |
| 10,206,501 | B1 * | 2/2019 | Kindred, Jr. | E04B 1/3445 |
| 10,329,783 | B2 * | 6/2019 | Sansom, III | A47K 11/02 |
| D973,904 | S * | 12/2022 | Kelley | D25/16 |
| D976,441 | S * | 1/2023 | Kelley | D25/16 |
| 2002/0026742 | A1 * | 3/2002 | Washington | A01M 31/025 |
| | | | | 135/96 |
| 2002/0074030 | A1 * | 6/2002 | Raines, Jr. | E04H 15/001 |
| | | | | 135/96 |
| 2002/0139613 | A1 * | 10/2002 | Hardy | B60P 1/02 |
| | | | | 182/63.1 |
| 2005/0194807 | A1 * | 9/2005 | Gonzalez | B60P 1/02 |
| | | | | 296/26.05 |
| 2007/0074933 | A1 * | 4/2007 | Kerns | A01M 31/025 |
| | | | | 182/127 |
| 2010/0025397 | A1 * | 2/2010 | Krohn | B65D 88/522 |
| | | | | 220/6 |
| 2010/0186309 | A1 * | 7/2010 | Hawkins | E04B 1/3445 |
| | | | | 52/79.5 |
| 2010/0287847 | A1 * | 11/2010 | Smith | E04B 1/3445 |
| | | | | 52/79.5 |
| 2013/0319490 | A1 * | 12/2013 | Rowley | E04H 15/48 |
| | | | | 135/144 |
| 2014/0034101 | A1 * | 2/2014 | Rowley | E04H 15/48 |
| | | | | 135/143 |
| 2014/0047781 | A1 * | 2/2014 | Miller | E04B 1/3445 |
| | | | | 52/79.5 |
| 2014/0251401 | A1 * | 9/2014 | Barber | E04H 1/1205 |
| | | | | 135/121 |
| 2015/0053246 | A1 * | 2/2015 | Lange | E04H 15/54 |
| | | | | 135/115 |
| 2017/0051497 | A1 * | 2/2017 | Kolbe | E04H 1/1205 |
| 2017/0335561 | A1 * | 11/2017 | Wickramasekera | H02S 20/30 |
| 2018/0290069 | A1 * | 10/2018 | McInerney | E04H 1/02 |
| 2020/0071925 | A1 * | 3/2020 | Shum | H02S 20/22 |
| 2020/0267967 | A1 * | 8/2020 | Reighard, II | A01M 31/025 |
| 2020/0391132 | A1 * | 12/2020 | McInerney | E04B 1/3445 |
| 2021/0227821 | A1 * | 7/2021 | Pederson | A01M 31/025 |
| 2021/0396036 | A1 * | 12/2021 | Elhart | B60D 1/66 |
| 2022/0022446 | A1 * | 1/2022 | Bell | A01M 31/025 |
| 2022/0243495 | A1 * | 8/2022 | Davis, Jr. | B60P 3/341 |
| 2022/0289096 | A1 * | 9/2022 | Wu | B60P 3/341 |
| 2023/0106634 | A1 * | 4/2023 | Dunne | E04B 1/344 |
| | | | | 52/79.5 |

FOREIGN PATENT DOCUMENTS

| | | | | |
|---|---|---|---|---|
| FR | 2826385 A1 | * | 12/2002 | B65D 88/524 |
| GB | 2225358 A | * | 5/1990 | E04B 1/3445 |
| WO | WO-9420699 A1 | * | 9/1994 | B65D 88/524 |
| WO | WO-2007063651 A1 | * | 6/2007 | E04B 1/34321 |
| WO | WO-2017065787 A1 | * | 4/2017 | A01M 31/02 |
| WO | WO-2020227768 A1 | * | 11/2020 | E04B 1/34363 |

* cited by examiner

COLLAPSIBLE HUNTING BLIND APPARATUS

CROSS-REFERENCE TO RELATED APPLICATION

This application claims priority from U.S. 63/041,803 filed Jun. 19, 2020, entitled "COLLAPSIBLE HUNTING BLIND APPARATUS". The entire disclosure of this application is hereby incorporated by reference in its entirety.

BACKGROUND OF THE DISCLOSURE

1. Field of the Disclosure

The disclosure relates in general to a hunting blind apparatus, and more particularly, to a collapsible hunting blind apparatus.

2. Background Art

Hunting entails killing of wild animals, such as deer and fowl. In some instances, such hunting includes a hunter using a blind apparatus or some type of structure to hide existence of the hunter. The hunter hides themselves inside of the blind apparatus so that the wild animals cannot detect the hunter, both visually and olfactorily. When the wild animals cannot detect the hunter, the probability of the hunter being able to successfully hunt the wild animals increases.

SUMMARY OF THE DISCLOSURE

The disclosure is directed to a collapsible hunting blind apparatus comprising a floor member, a roof member, and a plurality of walls. The roof member includes angled surfaces and side walls coupled to the angled surfaces. The plurality of walls are hingedly couplable to the floor member such that the plurality of walls hingedly fold inward toward opposite walls and atop the floor member. The roof member is couplable to the floor member while the plurality of walls are folded atop the floor member.

In at least one configuration, the floor member, the roof member, and the plurality of walls are plastic and hollow.

In at least one configuration, the floor member and the room member each include cut angled corners angled at approximately 45 degrees.

In at least one configuration, the roof member is couplable to the floor member via a plurality of clips disposed along a perimeter of the roof member.

In at least one configuration, the collapsible hunting blind further comprises a tow frame coupled to the floor member, with wheels and tires coupled to the tow frame.

In at least one configuration, the tow frame snaps into a bottom of the floor member.

In at least one configuration, the collapsible hunting blind apparatus further comprises a kickstand coupled to the tow frame.

In at least one configuration, the floor member includes tabs disposed along a perimeter of the floor member and each of the plurality of walls include indents that correspond to the tabs, the tabs and indents locking together to allow the walls to hingedly move with respect to the floor member.

In at least one configuration, the floor member further includes a plurality of wall supports, with the tabs being located on inside bottom edges of the plurality of wall supports.

In at least one configuration, the floor member includes a plurality of wall supports disposed around a perimeter of the floor member, the plurality of walls each being a different height and the plurality of the wall supports each being a different height such that a shortest wall support is coupled to a tallest wall and a tallest wall support is coupled to the shortest wall support.

In at least one configuration, at least one of the plurality of walls include an opening into which a door is disposed.

In at least one configuration, the opening and the door are hinged along a vertical edge thereof via tabs and indents.

In at least one configuration, the door includes an opening into which a sliding shoot port is disposed.

In at least one configuration, at least one of the plurality of walls include an opening into which a window is disposed.

In at least one configuration, the window includes one of a fixed glass and a fixed plexiglass therein.

In at least one configuration, the plurality of walls include structural recesses to increase a rigidity of the plurality of walls.

In at least one configuration, the roof member includes angled surfaces that form a top of the roof member, the angled surfaces being approximately 30 degrees off of horizontal.

In at least one configuration, the collapsible hunting blind apparatus is approximately 6 feet in length and width, and approximately 19.5 inches in height in a collapsed state In at least one configuration, the collapsible hunting blind apparatus further comprises a plurality of L brackets, disposed along sides of the plurality of walls, to secure neighboring walls from the plurality of walls together.

In at least one configuration, the collapsible hunting blind apparatus further comprises corner joint trim coupled along joints where any two of the plurality of walls meet.

BRIEF DESCRIPTION OF THE DRAWINGS

The disclosure will now be described with reference to the drawings wherein.

DETAILED DESCRIPTION OF THE DISCLOSURE

Figure 1:
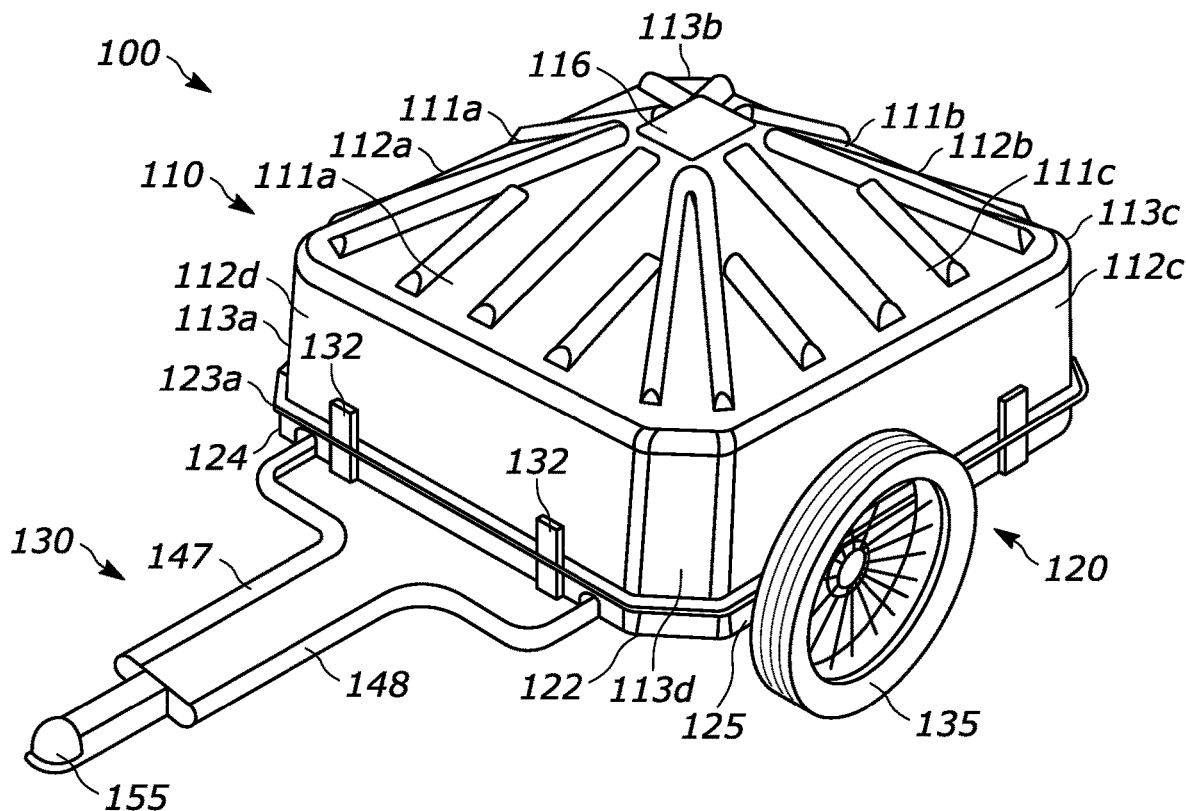
FIG. 1 illustrates an isometric view of an example collapsible hunting blind apparatus, in accordance with at least one embodiment disclosed herein.
Figure 2:
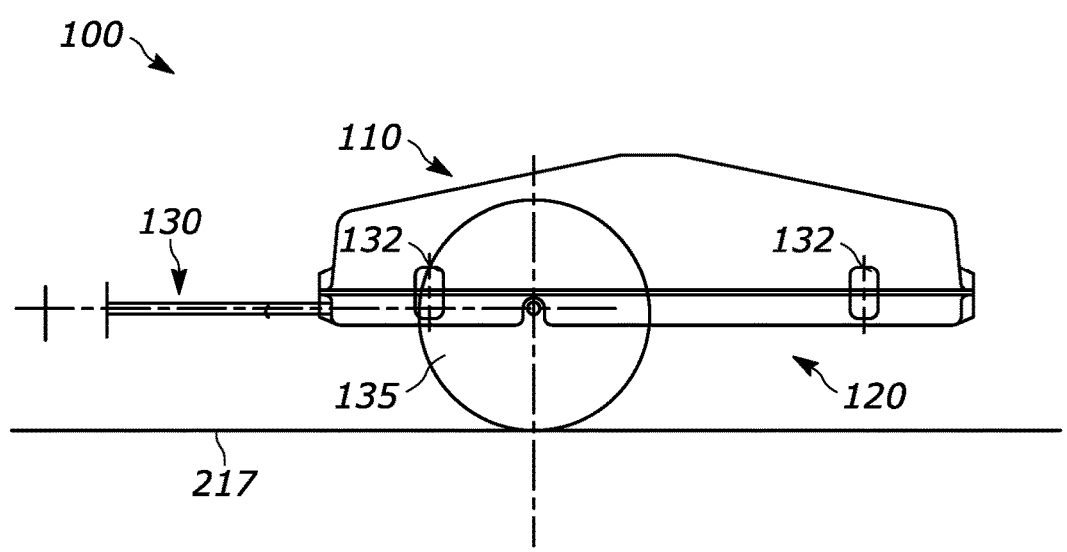
FIG. 2 illustrates a side view of the collapsible hunting blind apparatus shown in FIG. 1, in accordance with at least one embodiment disclosed herein.
Figure 3:
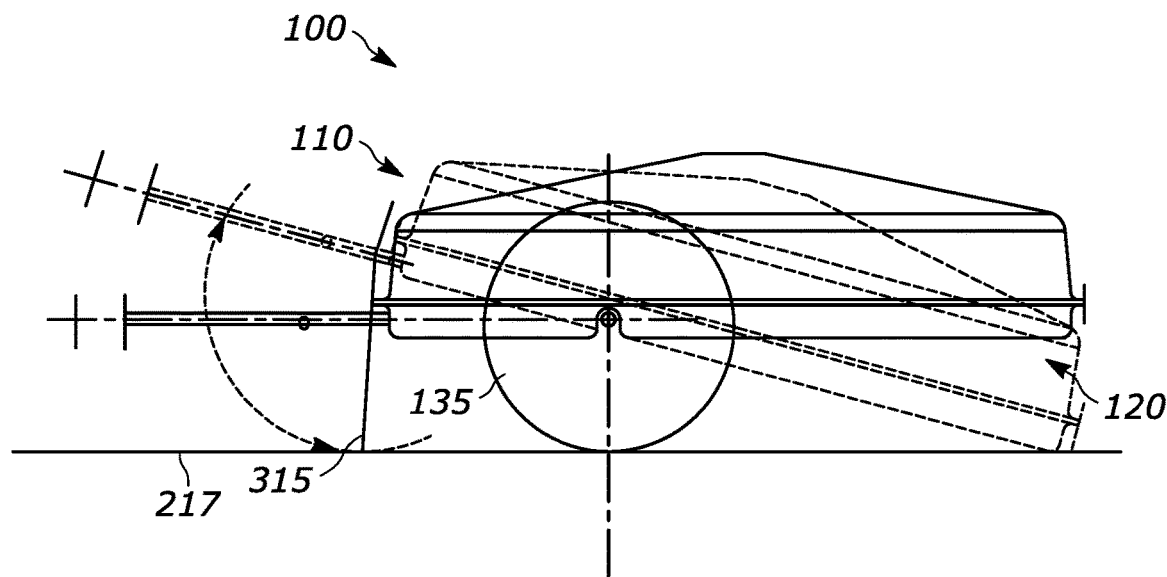
FIG. 3 illustrates another side view of the collapsible hunting blind apparatus shown in FIG. 1, in accordance with at least one embodiment disclosed herein.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

It has become appreciated that typical hunting blind apparatuses are difficult to assemble and are not portable, and that a hunting blind apparatus is needed that overcomes such deficiencies. As such, referring now to the drawings and in particular to FIG. 1, an apparatus is disclosed herein, such as a collapsible hunting blind apparatus 100 that at least mitigates such deficiencies. FIG. 1 illustrates the collapsible hunting blind apparatus 100 in a collapsed state, such as having been moved to a location at which the collapsible hunting blind apparatus 100 will be assembled and ready for use during hunting, or alternatively ready for movement to another location. In this collapsed state, the collapsible hunting blind apparatus 100 is shown as including a roof member 110 that is coupled to a floor member 120. In at least one embodiment, the collapsible hunting blind apparatus 100 can be approximately (+−10%) 6 feet in length and width, and approximately (+−10%) 19.5 inches in height when coupled in a collapsed state, as shown in FIGS. 1-4, with approximately (+−10%) 3 inches of the floor member 120 being exposed when the roof member 110 and the floor member 120 are coupled.

The roof member 110 can include various angled surfaces 111a, 111b, 111c, 111d that form a top of the roof member 110, such as approximately (+−10%) 30 degrees off of horizontal. These angled surfaces are coupled to roof side walls 112a, 112b, 112c, 112d, respectively, of the roof member 110. In at least one other embodiment (not shown), the roof member 110 can have a flat top or a domed top. In at least one embodiment, the height of the roof side walls 112a, 112b, 112c, 112d is such that there an open spaced is formed between the roof member 110 and the floor member 120 when the roof member 110 and the floor member 120 are coupled together. This open space can be used for storage, such as to store walls 512a, 512b, 512c, 512d (FIG. 5) of the collapsible hunting blind apparatus 100 where the roof member 110 can be coupled to the floor member 120 while the walls 512a, 512b, 512c, 512d are folded atop the floor member 120. In at least one embodiment, the components, that is the floor member 120, the roof member 110, and the plurality of walls 512a-d. of the collapsible hunting blind apparatus 100 can be manufactured with a blow molding process that makes such components as hollow plastic parts, other than those described herein that are manufactured from other materials.

In at least one embodiment, corners of both the roof member 110 and the floor member 120 can be notched such that the corners of the roof member 110 and the floor member 120 are not right angles, forming cut angled corners 113a, 113b, 113c, 113d on the roof member 110 and cut angled corners 123a, 123b, 123c, 123d on corners of the floor member 120. For example, these cut angled corners 113a, 113b, 113c, 113d and 123a, 123b, 123c, 123d can be angled at approximately (+−2 degrees) 45 degrees at corners of the roof member 110 and the floor member 120.

Figure 6:
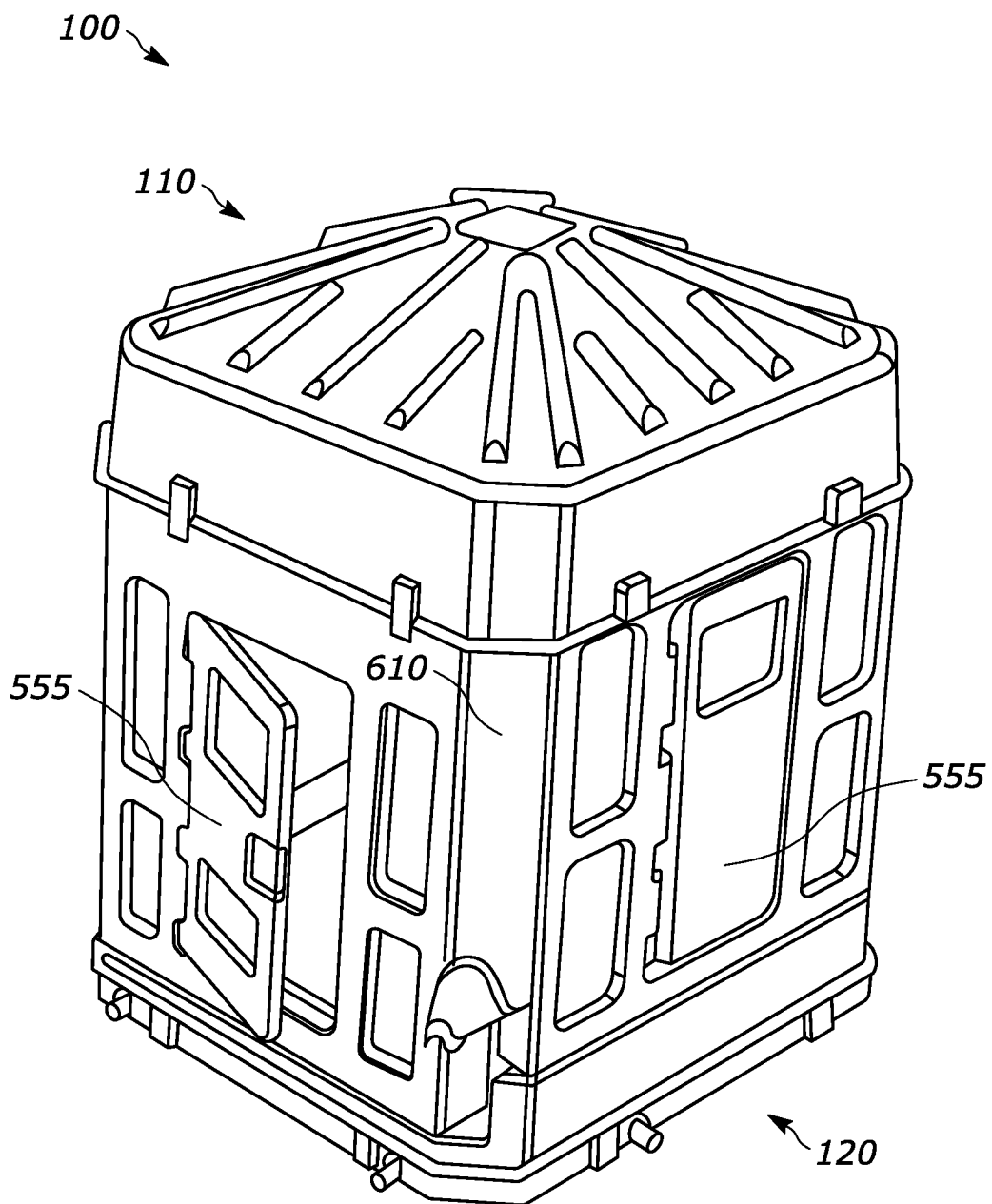
FIG. 6 illustrates another isometric view of the collapsible hunting blind apparatus shown in FIG. 1 after assembly, in accordance with at least one embodiment disclosed herein.
Figure 7:
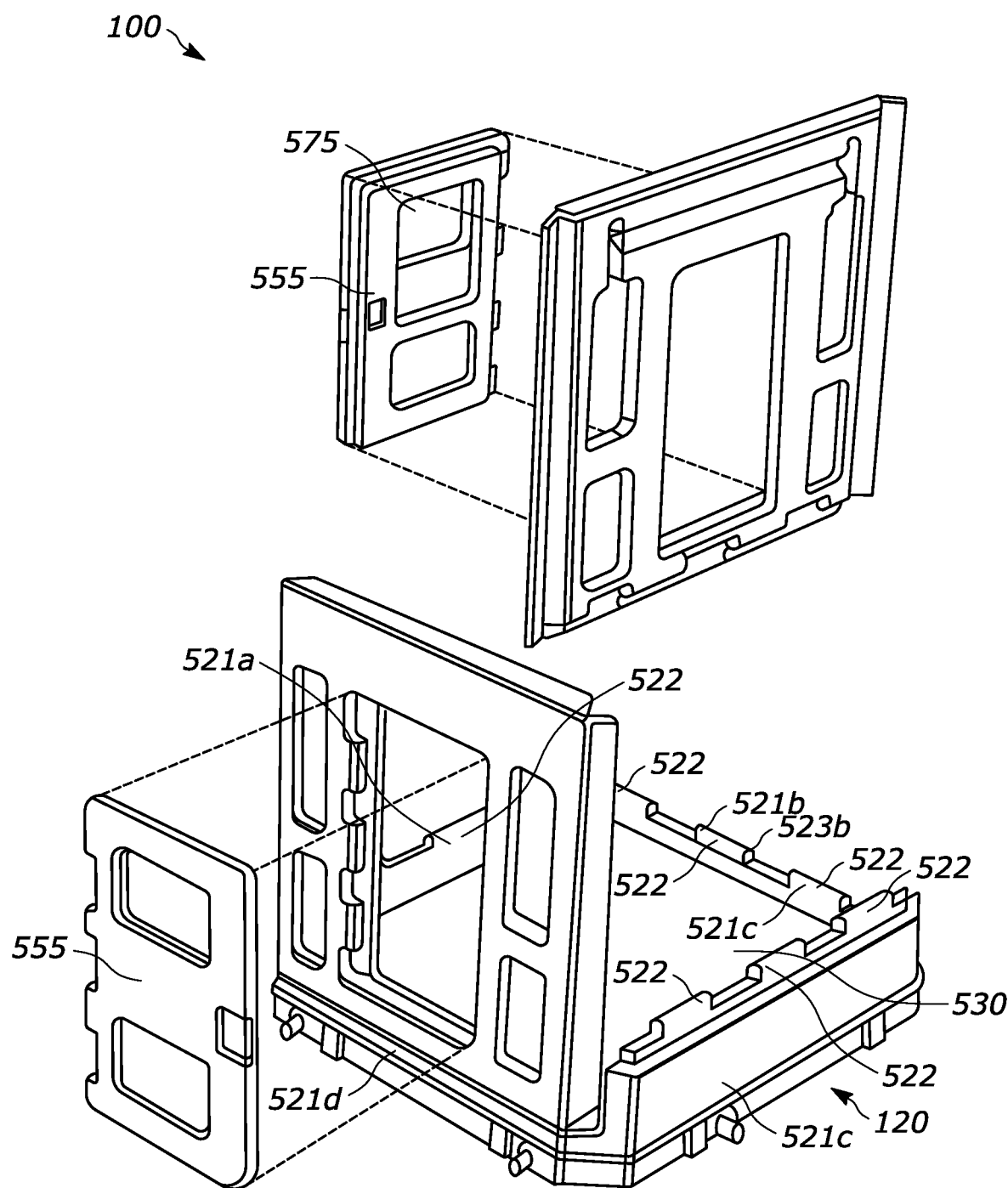
FIG. 7 illustrates an isometric view of the collapsible hunting blind apparatus shown in FIG. 1, with an exploded view of walls and doors, in accordance with at least one embodiment disclosed herein.

The floor member 120 is dimensioned to allow the roof member 110 to snap onto the floor member 120, as shown. In at least one embodiment, the roof member 110 is coupled to the floor member 120 via a plurality of clips, such as a plurality of "Z" clips 132, disposed proximate to corners of the roof member 110, as shown. These "Z" clips 132 can be disposed along a perimeter of the roof member 110, for example two (2) per on each side of the roof member 110. The "Z" clips 132 can be used to draw the floor member 120 into the roof member 110, latching these two members together. The "Z" clips 132 can also be used to draw latch the roof member 110 onto the walls 512a, 512b, 512c, 512d, as shown in FIG. 6.

In at least one embodiment, various ridges 141 can be disposed into and/or onto the roof member 110, the ridges 141 adding rigidity to the roof member 110. In at least one embodiment, the roof member 110 can include a skylight or roof window 116 disposed into the roof member 110. The roof window 116 allows natural light into the collapsible hunting blind apparatus 100 during use. In other embodiments, the collapsible hunting blind apparatus 100 roof member 116 is opaque throughout.

In at least one embodiment, the collapsible hunting blind apparatus 100 can further include a tow frame 130 that allows for ease of movement of the collapsible hunting blind apparatus 100 from one location to another, such as via an All-Terrain Vehicle (ATV), while hunting, such as via wheels and tires 135 coupled to the tow frame 130. In at least one embodiment, the wheels and tires 135 can be approximately (+−10%) 26 inches in diameter. The tow frame 130 can include a first tow frame member 147 that is coupled to and proximate to a first side 124 of the floor member 120 and a second tow frame member 148 that is coupled to and disposed proximate to a second side 125 of the floor member 120. The tow frame 130 can snap into a bottom 122 of the floor member 120, making the tow frame 130 extend approximately (+−2%) parallel to the bottom 122 of the floor member 120. Although a user can grasp the tow frame 130 and walk the collapsible hunting blind apparatus 100 to a desired location, in at least one embodiment the collapsible hunting blind apparatus 100 can further include a trailer hitch 155, coupled to the tow frame 130, disposed a distance (e.g., approximately three feet) away from the floor member 120.

Figure 4:
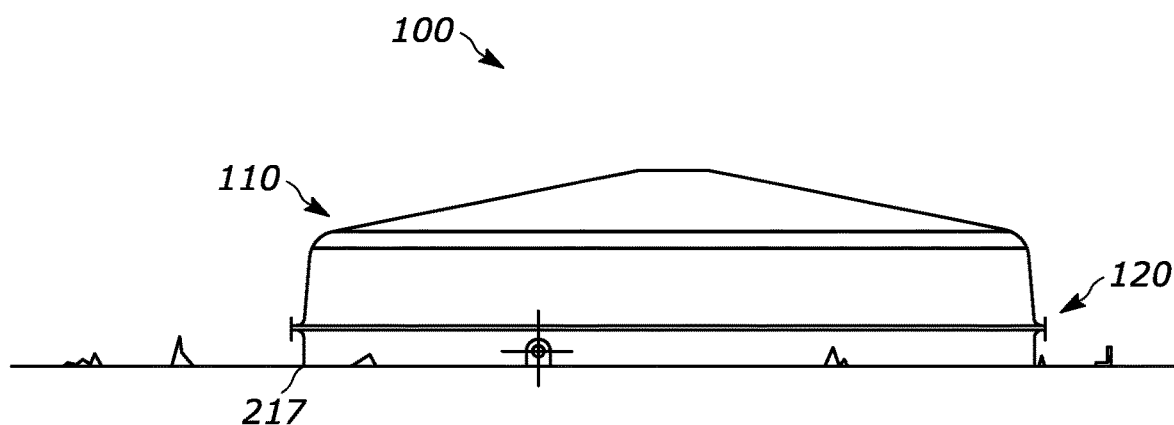
FIG. 4 illustrates yet another side view of the collapsible hunting blind apparatus shown in FIG. 1, in accordance with at least one embodiment disclosed herein.

In at least one embodiment, the collapsible hunting blind apparatus 100 can further include a kickstand 315 (FIG. 3) coupled to the tow frame 130. The kickstand 315 allows the collapsible hunting blind apparatus 100 to remain in an angled position, with a back of the collapsible hunting blind apparatus 100 touching a top 217 of a ground onto which the collapsible hunting blind apparatus 100 is to be placed and removed. The kickstand 315 assists with placing and removing the collapsible hunting blind apparatus 100 at and from a desired location. In at least one embodiment, the tow frame 130 can removeable. The tow frame 130 can be removed from the collapsible hunting blind apparatus 100, placing the collapsible hunting blind apparatus 100 onto the top 217 of the ground, as shown in FIG. 4.

Figure 5:
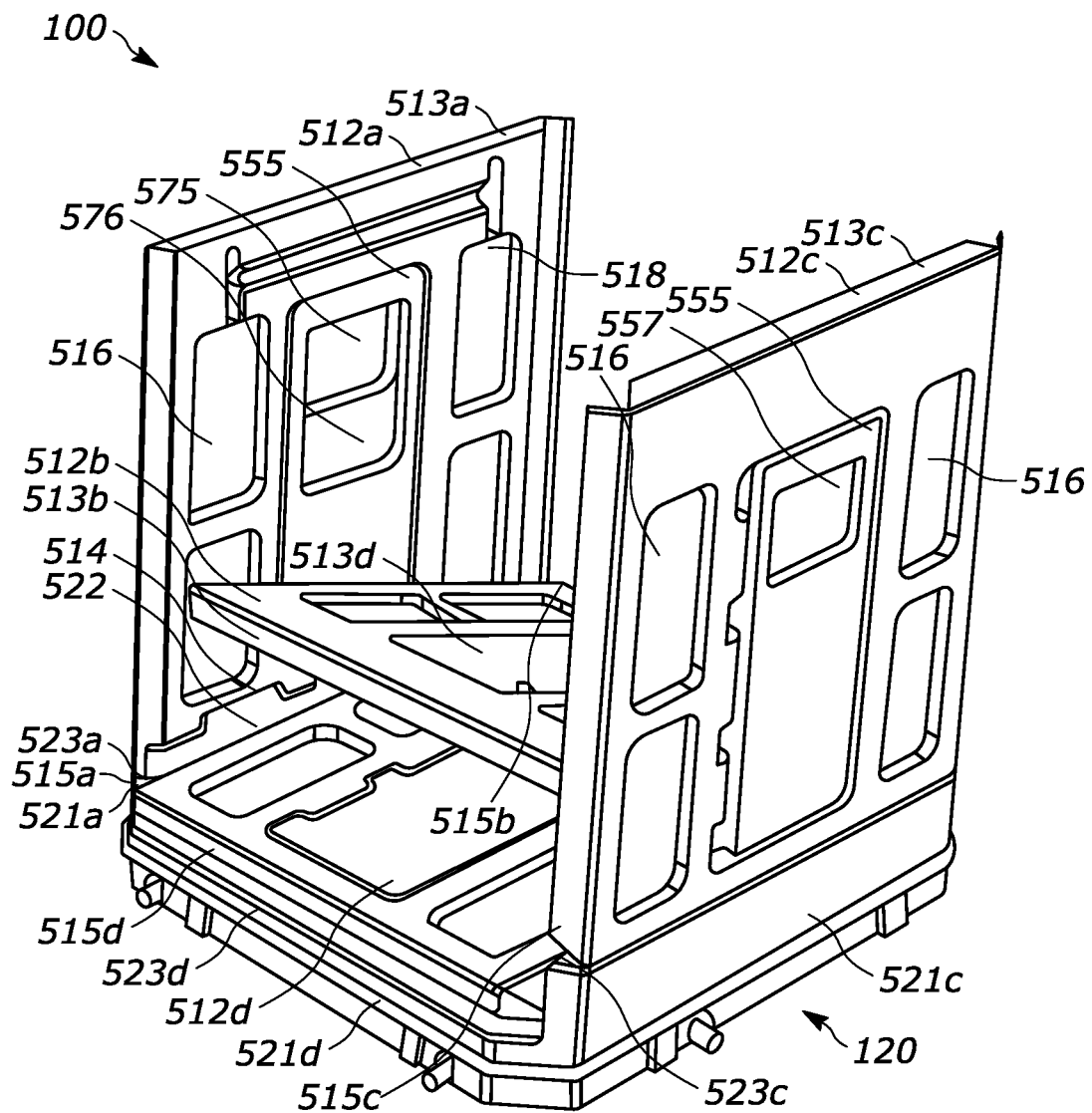
FIG. 5 illustrates another isometric view of the collapsible hunting blind apparatus shown in FIG. 1 in process of assembly and disassembly, in accordance with at least one embodiment disclosed herein.

With reference to FIG. 5, the collapsible hunting blind apparatus 100 is shown in process of either being collapsed or erected. To collapse the collapsible hunting blind apparatus 100, the roof member 110 is detached and the walls 512*a*, 512*b*, 512*c*, 512*d* are folded atop one another, as shown. To erect the collapsible hunting blind apparatus 100, the walls 512*a*, 512*b*, 512*c*, 512*d* are folded upward into approximately (+−2 degrees) a vertical orientation. Once the walls 512*a*, 512*b*, 512*c*, 512*d* are folded upward, the roof member 110 is then coupled to tops 513*a*, 513*b*, 513*c*, 513*d* of the walls 512*a*, 512*b*, 512*c*, 512*d*, respectively.

In at least one embodiment bottoms 515*a*, 515*b*, 515*c*, 515*d* of the walls 512*a*, 512*b*, 512*c*, 512*d*, respectively, are "hinged" to allow the walls 512*a*, 512*b*, 512*c*, 512*d* to hingedly fold atop the floor member 120. In at least one embodiment, the floor member 120 includes tabs 522 disposed along a perimeter of the floor member 120, each of the tabs 522 extending upward away from a base 530 of the floor member 120, the base 530 typically placed onto a ground during setup of the collapsible hunting blind apparatus 100. In the example shown, three such tabs 522 are included on each side of the floor member, although use of more or less tabs 522 are possible. In at least one embodiment the floor member 120 includes wall supports 521*a*, 521*b*, 521*c*, 521*d* disposed around a perimeter of the floor member 120 and perpendicularly coupled to the base 530, the wall supports 521*a*, 521*b*, 521*c*, 521*d* including these tabs 522 atop the wall supports 521*a*, 521*b*, 521*c*, 521*d*. In at least one embodiment, these tabs 522 can be located on inside bottom edges of the wall supports 521*a*, 521*b*, 521*c*, 521*d*, as shown. The tabs 522 correspond to indents 514 on the bottoms 515*a*, 515*b*, 515*c*, 515*d* of the walls 512*a*, 512*b*, 512*c*, 512*d*, such as on inside bottom edges of the walls 512*a*, 512*b*, 512*c*, 512*d*. The tabs 522 and indents 514 can lock together to allow the walls 512*a*, 512*b*, 512*c*, 512*d* to hingedly move with respect to the wall supports 521*a*, 521*b*, 521*c*, 521*d*. Thus, in at least one embodiment the walls 512*a*, 512*b*, 512*c*, 512*d* can fold inward toward opposite walls, atop the floor member 120. In at least one embodiment, the bottoms 515*a*, 515*b*, 515*c*, 515*d* of the walls 512*a*, 512*b*, 512*c*, 512*d* can be angled at approximately (+−3%) 45 degrees, as shown. Likewise, the tops 523*a*, 523*b*, 523*c*, 523*d* of the wall supports 521*a*, 521*b*, 521*c*, 521*d* can be angled at approximately (+−3%) 45 degrees, such that the walls 512*a*, 512*b*, 512*c*, 512*d* can move with respect to the wall supports 521*a*, 521*b*, 521*c*, 521*d* without interference at their pointed of contact, allowing the walls 512*a*, 512*b*, 512*c*, 512*d* to fold atop the floor member 120 without, in at least one embodiment, becoming decoupled from the wall supports 521*a*, 521*b*, 521*c*, 521*d*.

In at least one embodiment, the wall supports 521*a*, 521*b*, 521*c*, 521*d* can each be a different height and the walls 512*a*, 512*b*, 512*c*, 512*d* can each be a different height to correspond to the heights of the wall supports 521*a*, 521*b*, 521*c*, 521*d*, as shown. For example, the tallest wall support 521*c* is coupled to a shortest wall 512*c*, and the shortest wall support 521*d* is coupled to the tallest wall 512*d*, etc., such that a level surface is formed at the tops 513*a*, 513*b*, 513*c*, 513*d* of the walls 512*a*, 512*b*, 512*c*, 512*d* when assembled to allow the roof member 110 to lie flat across tops 513*a*, 513*b*, 513*c*, 513*d* of the walls 512*a*, 512*b*, 512*c*, 512*d*. As shown, the wall support 521*d* is the shortest of the wall supports 521*a*, 521*b*, 521*c*, 521*d*, such that the wall 512*d* can hingedly fold flat against the floor member 120 while the wall 512*d* remains hingedly coupled to the wall support 521*d*. Likewise, wall support 521*b* is the next tallest of the wall supports 521*a*, 521*b*, 521*c*, 521*d*, such that the wall 512*b* can hingedly fold flat against the wall support 521*d* while remaining hingedly coupled to the wall support 521*d*, as shown. Likewise, wall support 521*a* is the next tallest of the wall supports 521*a*, 521*b*, 521*c*, 521*d*, such that the wall 512*a* can hingedly fold flat against the wall support 521*b* while remaining hingedly coupled to the wall support 521*d*. Likewise, wall support 521*c* is the tallest of the wall supports 521*a*, 521*b*, 521*c*, 521*d*, such that the wall 512*c* can hingedly fold flat against the wall support 521*a* while remaining hingedly coupled to the wall support 521*d*. In at least one embodiment, the walls 512*a*, 512*b*, 512*c*, 512*d* are substantially identical except that the walls 512*a*, 512*b*, 512*c*, 512*d* are of different height. Thus, the walls 512*a*, 512*b*, 512*c*, 512*d* can be manufactured from a single mold to save cost, and cut to proper heights after manufacture. The walls 512*a*, 512*b*, 512*c*, 512*d* are folded up in order from shortest to tallest, with the wall 512*d* being last up. Likewise, the walls 512*a*, 512*b*, 512*c*, 512*d* are folded in atop the base 530 in order from shortest to tallest, with the wall 512*d* being last down atop the base 530.

Figure 15:
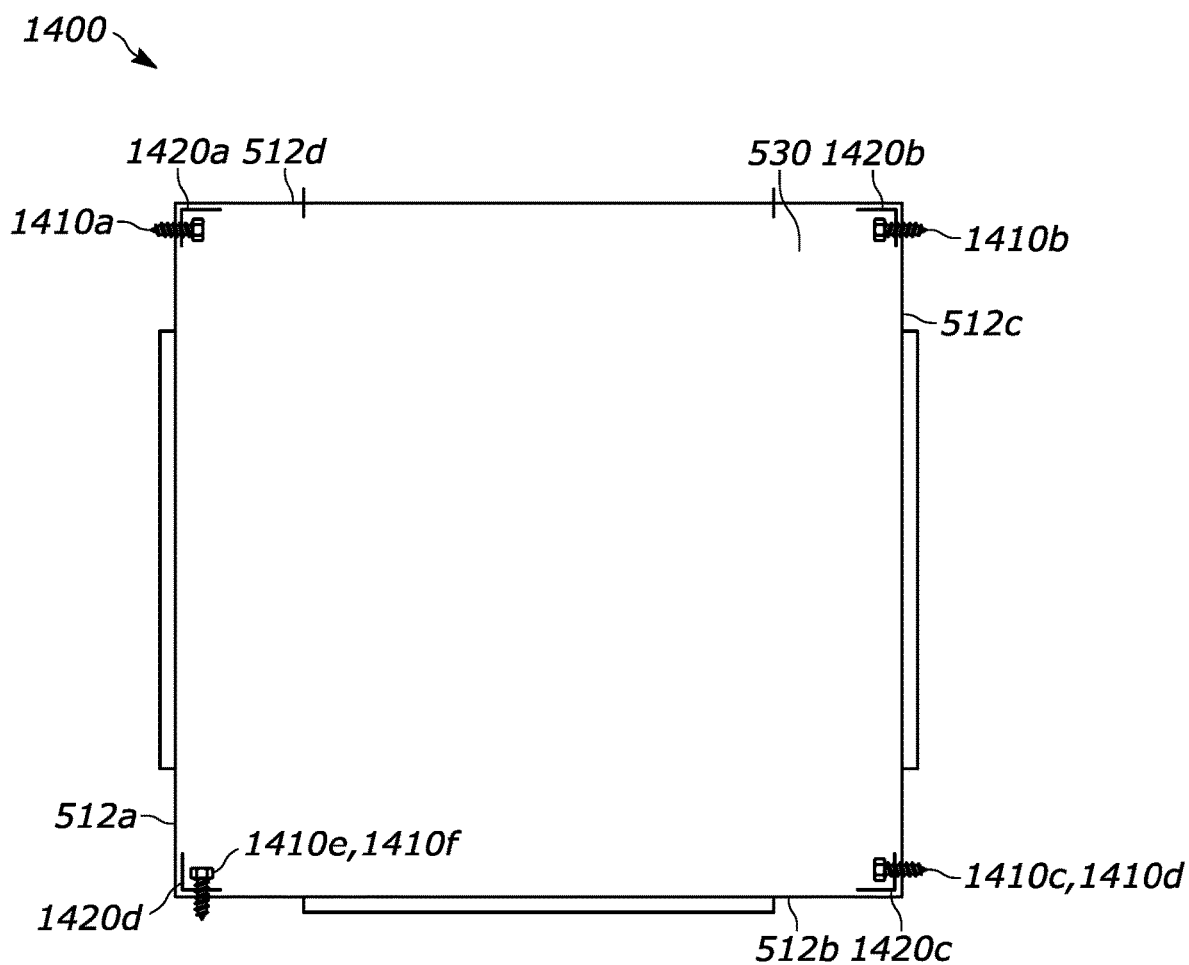
FIG. 15 illustrates the coupling system shown in FIG. 14, shown after the walls are coupled together, in accordance with at least one embodiment disclosed herein.

In at least one embodiment, the walls 512*a*, 512*b*, 512*c*, 512*d* can include various structural recesses 516 (e.g., rectangular shaped) into the walls 512*a*, 512*b*, 512*c*, 512*d* that increase a rigidity of the walls 512*a*, 512*b*, 512*c*, 512*d*, as shown. Although four such various structural recesses 516 are shown for each of the walls 512*a*, 512*b*, 512*c*, 512*d*, more or less structural recesses 516 can be used. Any or all of the walls 512*a*, 512*b*, 512*c*, 512*d* can also include at least one opening into which a door 555 can be disposed, as shown. In at least one embodiment, any of the structural recesses 516 can be removed during manufacture or thereafter to form a window 518 disposed in the walls 512*a*, 512*b*, 512*c*, 512*d*, or even outside of openings in the walls 512*a*, 512*b*, 512*c*, 512*d* as shown in FIG. 15. In at least one embodiment, the window 518 can include a fixed glass or fixed plexiglass therein to assist with making the collapsible hunting blind apparatus 100 weather resistant. The opening and the door 555 can be hinged along one of its vertical edges, as shown, similar to the tab and indent hinge arrangement described above for coupling the walls 512*a*, 512*b*, 512*c*, 512*d* and the wall supports 521*a*, 521*b*, 521*c*, 521*d*. In at least one embodiment, the door 555 can include an opening 557 therein, which in at least one embodiment can include a sliding shoot port 575 disposed therein. The sliding shoot port 575 includes a sliding panel 576 that can slide vertically up and down when a hunter desires access to an environment surrounding the collapsible hunting blind apparatus 100 for hunting.

With reference to FIG. 6, the collapsible hunting blind apparatus 100 is shown as being in an assembled state. In at least one embodiment, the collapsible hunting blind apparatus 100 can further include trim, such as corner joint trim 610. The corner joint trim 610 can be a flexible material, such as vinyl, that is coupled, such as via a hook and loop fastener, along joints where any two of the walls 512a, 512b, 512c, 512d meet, such as at corners of the collapsible hunting blind apparatus 100, as shown. In at least one embodiment, the corner joint trim 610 can be coupled to the walls 512a, 512b, 512c, 512d via a detachable fastener, e.g., a hook-and-loop fastener such as that made by Velcro. In this assembled state, the "Z" clips 132 are used to clip the roof member 110 to tops 513a, 513b, 513c, 513d of the walls 512a, 512b, 512c, 512d, as shown.

Figure 8:
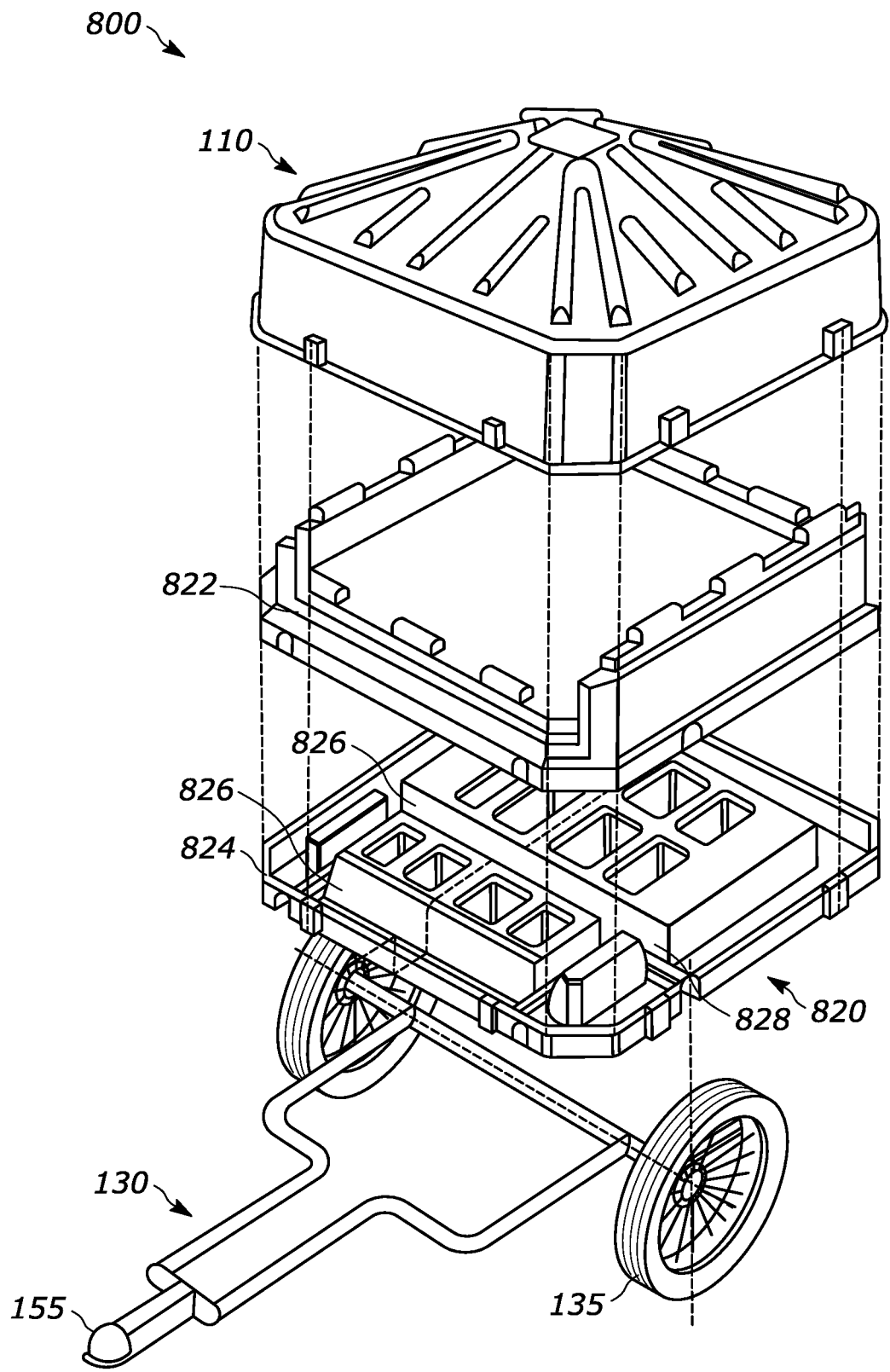
FIG. 8 illustrates an isometric view of another example collapsible hunting blind apparatus, with an exploded view of roof member and floor member, in accordance with at least one embodiment disclosed herein.

With reference to FIG. 8, another collapsible hunting blind apparatus 800 is disclosed that includes another type of floor member. In at least one embodiment, the collapsible hunting blind apparatus 800 can include a two-part floor member 820, including a first floor member 822 that acts as a floor of the collapsible hunting blind apparatus 800 and a second floor member 824 that acts as s floor base or sub-floor. The second floor member 824 can include various floor supports 826 that contact the first floor member 822 when the first floor member 822 is coupled to the second floor member 824. These floor supports 826 can be hollow to minimize an amount of material that is needed to manufacture the floor member 824, while adding rigidity to the first floor member 822 via their support thereof. In at least one embodiment, a channel 828 can be disposed between these floor supports 826, with a portion of the tow frame 130 being disposed within this channel 828.

Figure 9:
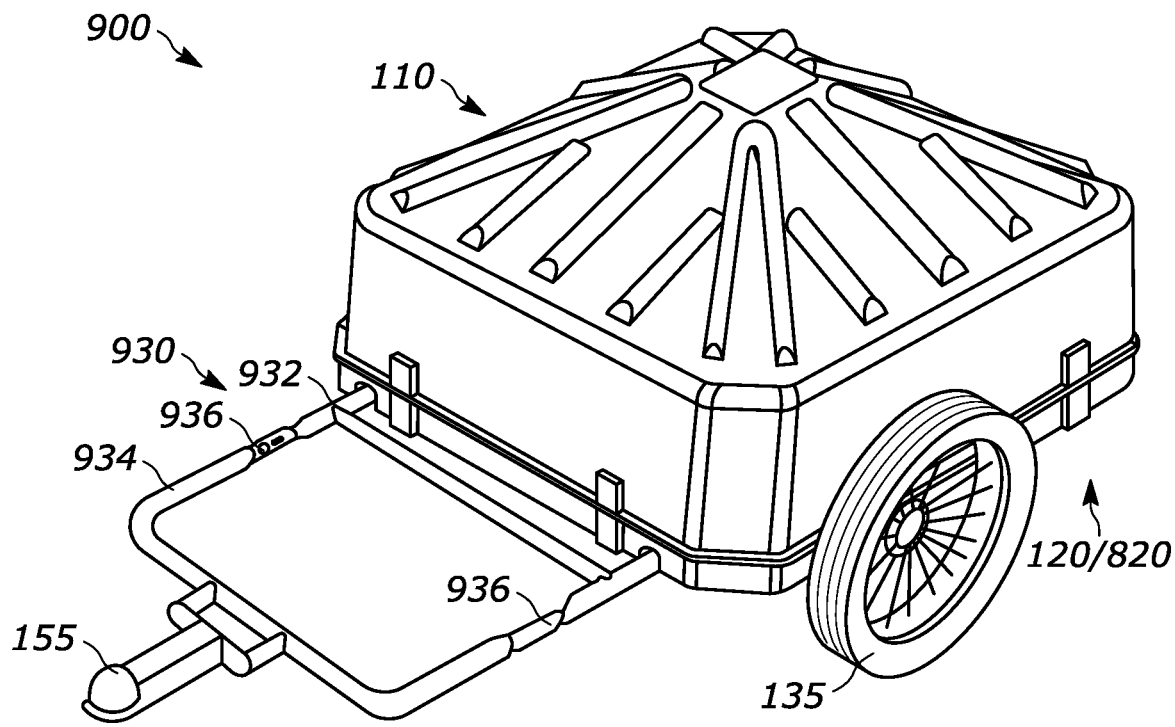
FIG. 9 illustrates an isometric view of another collapsible hunting blind apparatus, with another example towing frame, in accordance with at least one embodiment disclosed herein.
Figure 10:
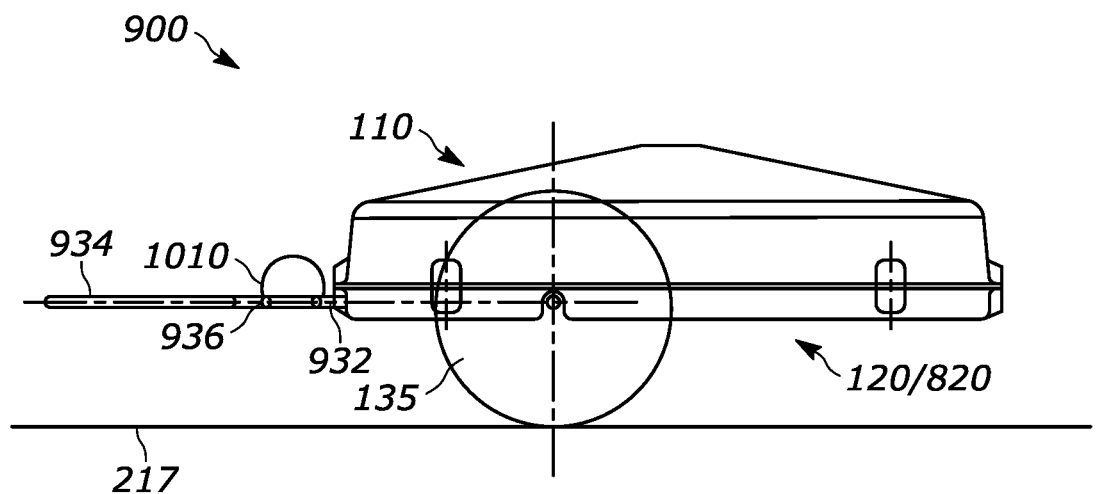
FIG. 10 illustrates a side view of the collapsible hunting blind apparatus shown in FIG. 9, in accordance with at least one embodiment disclosed herein.
Figure 11:
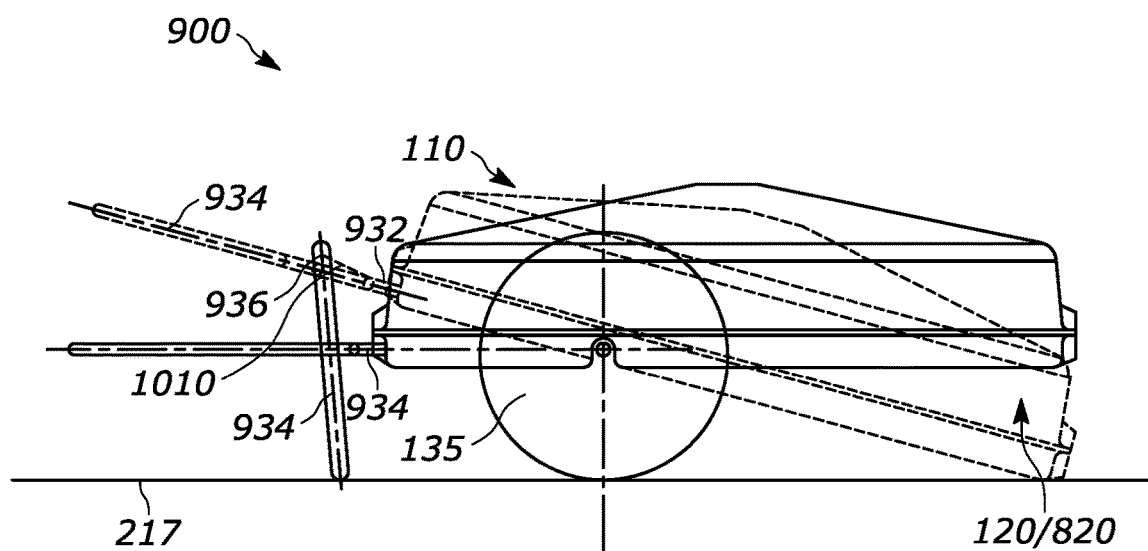
FIG. 11 illustrates another side view of the collapsible hunting blind apparatus shown in FIG. 9, in accordance with at least one embodiment disclosed herein.
Figure 12:
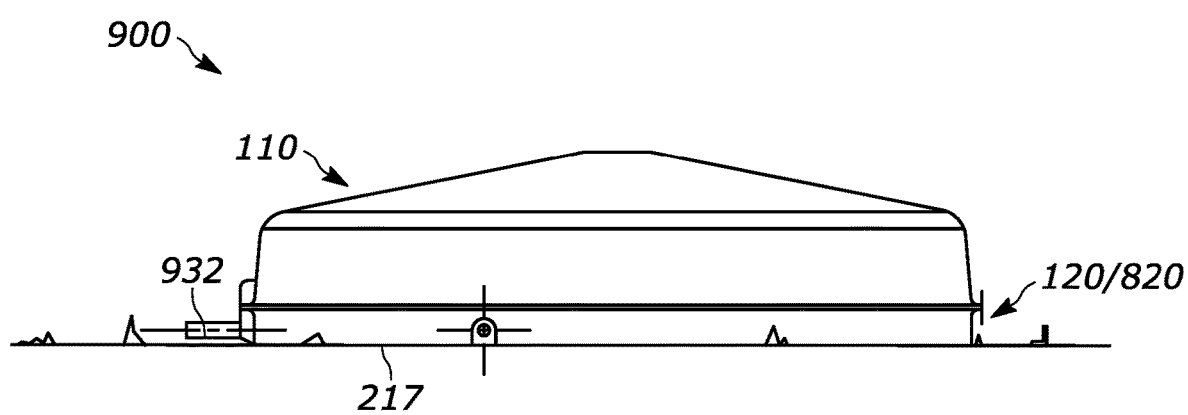
FIG. 12 illustrates yet another side view of the collapsible hunting blind apparatus shown in FIG. 9, in accordance with at least one embodiment disclosed herein.
Figure 13:
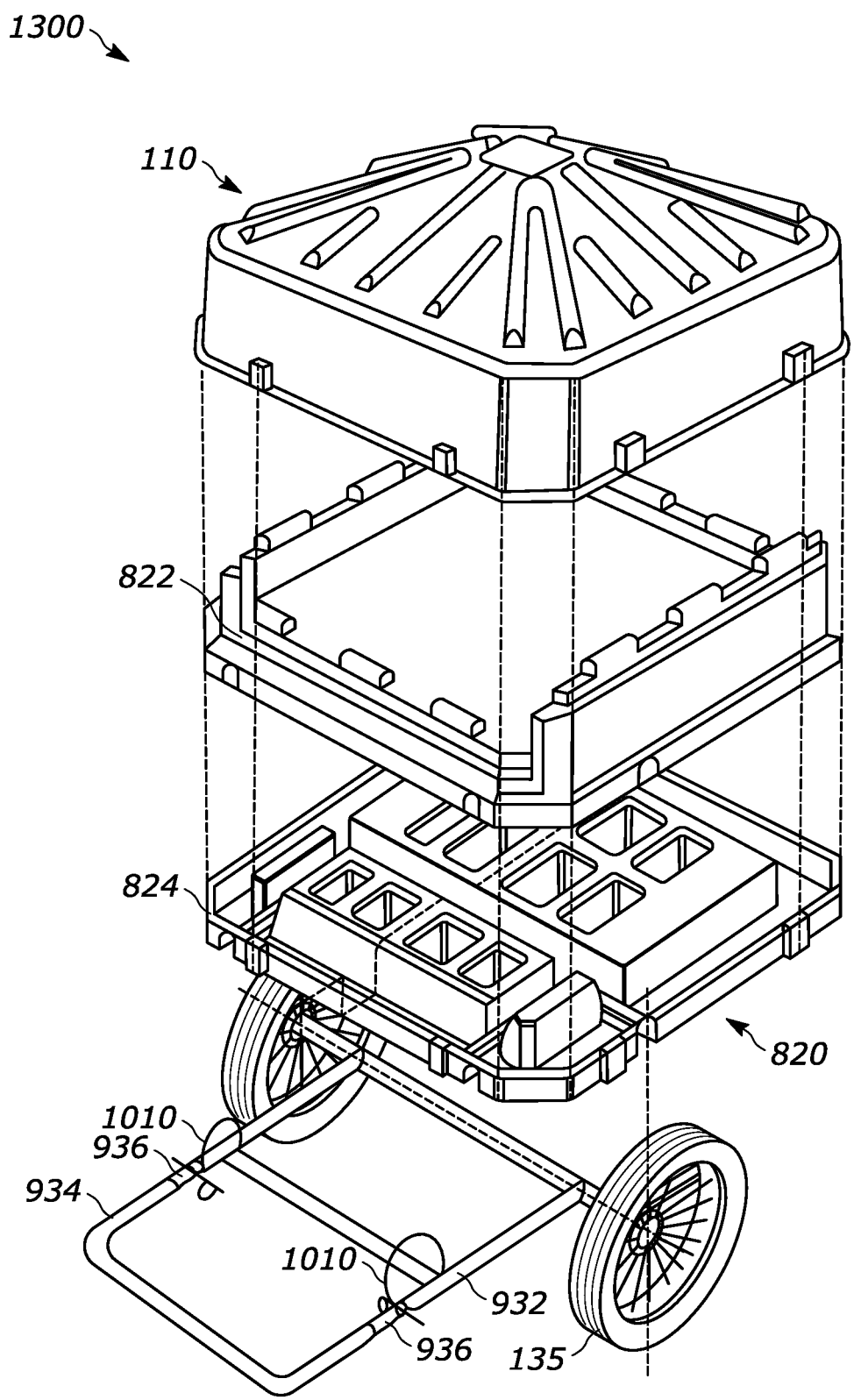
FIG. 13 illustrates an isometric view of another example collapsible hunting blind apparatus, with an exploded view of roof member and floor member, in accordance with at least one embodiment disclosed herein.

With reference to FIG. 9, another collapsible hunting blind apparatus 900 is discussed that uses another type of tow frame, such as a tow frame 930. The tow frame 930 includes a first tow frame portion 932 that is coupled to the floor member 120. The tow frame 930 also includes a second tow frame portion 934 that is hingedly coupled to the first tow frame portion 932, such as via pins 936. The tow frame 930 can further include lanyards 1010 that are coupled to the pins 936 and the first tow frame portion 932, as shown. The lanyards 1010 prevent loss of the pins 936 when the pins 936 are not being used to maintain coupling between the first tow frame portion 932 and the second tow frame portion 934. The trailer hitch 155 can be optionally coupled to the second tow frame portion 934 in at least one embodiment shown in FIG. 9, and another embodiment shown in FIG. 13 illustrates another collapsible hunting blind apparatus 1300 that omits the trailer hitch 155. During towing, the second tow frame portion 934 is fixedly coupled to the first tow frame portion 932 such that the first tow frame portion 932 is in line with the second tow frame portion 934, as shown in FIG. 9. During setup and takedown of the collapsible hunting blind apparatus 900, the second tow frame portion 934 can be rotated relative to the first tow frame portion 932, such that the second tow frame portion 934 acts as a kickstand when rotated down to contact the top 217 of the ground onto which the collapsible hunting blind apparatus 900 is to be placed or extracted.

Figure 14:
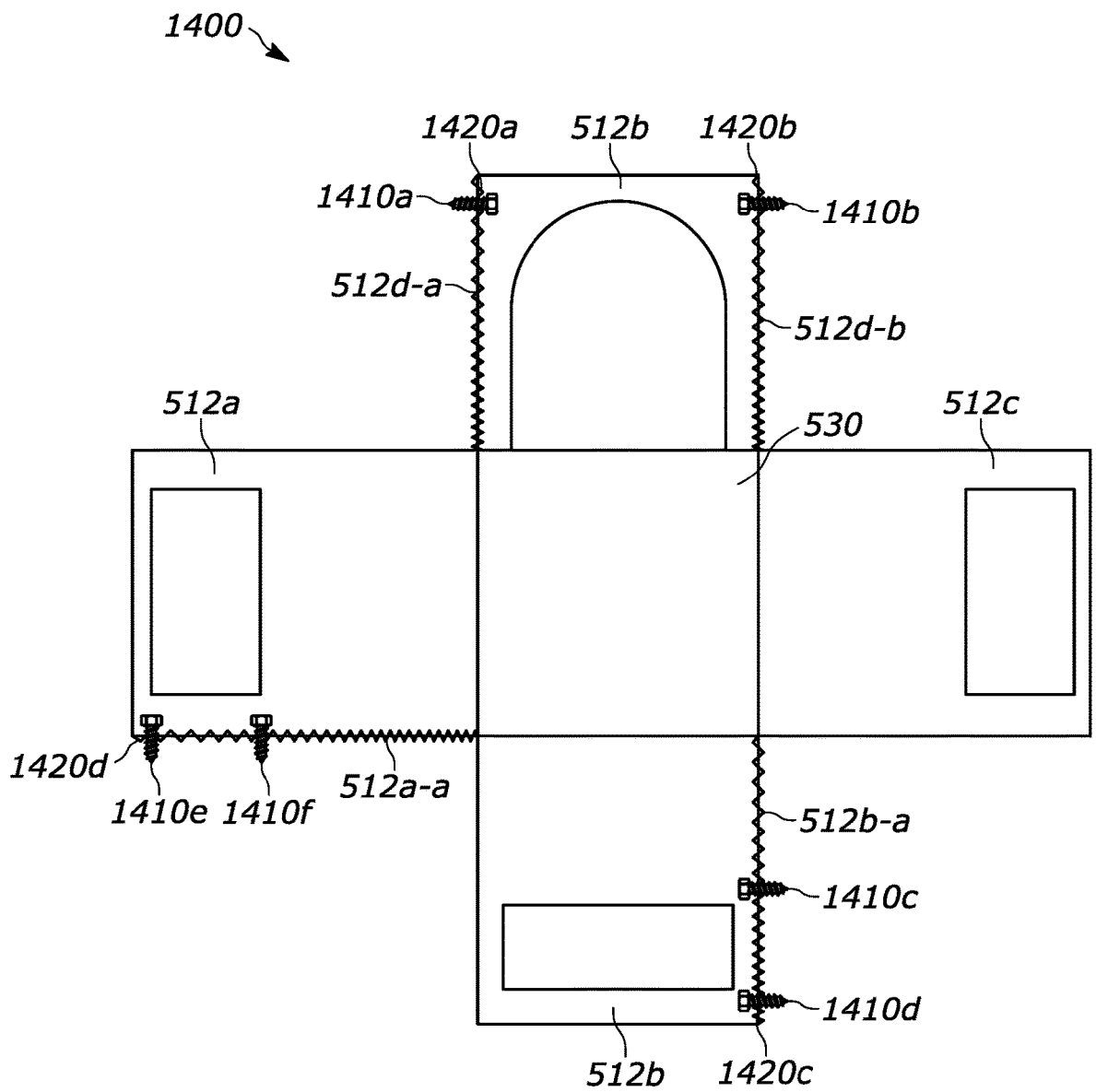
FIG. 14 illustrates an example coupling system to couple the walls of the collapsible hunting blind apparatus, shown with the walls folded out as laying on a ground before the walls are coupled together, in accordance with at least one embodiment disclosed herein.

Now with reference to FIG. 14, a coupling system, such as coupling system 1400 shown, is used to couple the walls of the collapsible hunting blind apparatus 100, 800, 900, 1300, during assembly. FIG. 14 illustrates the collapsible hunting blind apparatus 100, 800, 900, 1300 before the walls 512a, 512b, 512c, 512d are coupled together, in accordance with at least one embodiment disclosed herein.

The coupling system 1400 can include a plurality of couplers, such as bolts 1410a, 1410b, 1410c, 1410d, 1410e, 1410f used in conjunction with nuts (not shown), that are used together with a plurality of brackets, such as L brackets 1420a, 1420b, 1420c, 1420d shown as wavy lines along sides of the walls 512a, 512b, 512c, 512d. The L brackets 1420a, 1420b, 1420c, 1420d can be variously disposed along sides of the walls 512a, 512b, 512c, 512d where two neighboring walls meet once folded into place during setup of the collapsible hunting blind apparatus 100, 800, 900, 1300, the L brackets 1420a, 1420b, 1420c, 1420d used to secure the neighboring walls together. In at least one configuration, the L bracket 1420a can be disposed along a first side 512d-a of wall 512d and the L bracket 1420b can be disposed along a second side 512d-b of the wall 512d, as shown. The L bracket 1420c can be disposed along a first side 512b-a of the wall 512b, and the L bracket 1420d can be disposed along a first side 512a-a of the wall 512a.

Bolt 1410a can be disposed though an opening in L bracket 1420a, and bolt 1410b can be disposed through an opening through L bracket 1420b. Bolt 1410c and bolt 1410d can be disposed through openings in L bracket 1420c, and bolt 1410e and bolt 1410f can be disposed through openings in L bracket 1420d. One skilled in the art would appreciate that the illustrated disposition of the L brackets 1420a, 1420b, 1420c, 1420d is exemplary, with the L brackets 1420a, 1420b, 1420c, 1420d being disposable on other sides of the walls 512a, 512b, 512c, 512d that provides for coupling of the sides of the walls 512a, 512b, 512c, 512d. Also, although the L brackets 1420a, 1420b, 1420c, 1420d are shown as being substantially a same length as a side of a wall onto which the L brackets 1420a, 1420b, 1420c, 1420d are disposed, the L brackets 1420a, 1420b, 1420c, 1420d can in other configurations be smaller than that shown. Likewise, location of the bolts 1410a, 1410b, 1410c, 1410d, 1410e, 1410f can be different than that show.

FIG. 15 illustrates the coupling system shown in FIG. 14, shown after the walls 512a, 512b, 512c, 512d are coupled together, in accordance with at least one embodiment disclosed herein. The bolts 1410a, 1410b, 1410c, 1410d, 1410e, 1410f are disposed through openings in the walls 512a, 512b, 512c, 512d, and secured with nuts (not shown) thereafter. As shown, the bolt 1410a is disposed through an opening in wall 512a, bolt 1410b is disposed through an opening in wall 512c, bolts 1410c, 1410d are disposed through openings in wall 512c, and bolts 1410e, 1410f are disposed through an opening in wall 512b. One the walls 512a, 512b, 512c, 512d are secured with the bolts 1410a, 1410b, 1410c, 1410d, 1410e, 1410f and the L brackets 1420a, 1420b, 1420c, 1420d, the roof member 110 can be disposed atop the walls 512a, 512b, 512c, 512d so secured.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:
1. A collapsible hunting blind apparatus, comprising:
a floor member comprising a base member defined by plurality of sides with a wall support member extending upwardly from each of the plurality of sides, each wall support member including an inner surface, an outer surface and an upper wall, with a plurality of tabs extending upwardly from the upper wall along the inner surface and spaced apart from the outer surface;

a wall corresponding to each wall support member, each of the plurality of walls including an inner surface, an outer surface an upper end and lower surface, a plurality of indents defined in the lower surface along the inner surface and spaced apart from the outer surface, wherein the tabs of each wall support member engage corresponding indents of a corresponding wall in a locked hinged engagement, with the locked hinged engagement allowing each wall to hingedly move from a folded orientation wherein each wall is collapsed inwardly so that the inner surface overlies the floor member, to a deployed orientation wherein the outer surface of each wall meets the outer wall of a corresponding wall support member, and wherein each of the plurality of wall support members have varying heights such that the plurality of walls can be collapsed inwardly into the folded orientation:

a roof member having a top and a plurality of sidewalls depending therefrom, and terminating at a lower end, the lower end of the roof member configured to engage the upper end of the plurality of walls so as to overlie the floor member when the plurality of walls are in the deployed orientation, and configured to engage the floor member when the plurality of walls are in the folded orientation, thereby encapsulating the plurality of walls within a cavity defined by the floor member and the roof member.

2. The collapsible hunting blind apparatus according to claim 1 wherein each of the plurality of walls are plastic and hollow, with the plurality of indents being integrally formed therein.

3. The collapsible hunting blind apparatus according to claim 1 wherein the roof member includes a plurality of roof clip portions disposed proximate the lower end of the sidewalls, a plurality of the walls include a wall lip portion and the floor member including a plurality of floor lip portions, wherein in the deployed orientation, the plurality of roof lip portions are structurally configured to engage with a corresponding one of the wall lip portions of the plurality of the walls, so as to affix the roof member atop the plurality of walls and wherein in the folded orientation, the plurality of roof lip portions are structurally configured to engage with a corresponding one of the plurality of floor lip portions, so as to releasably attach the roof to the floor, capturing the walls and the wall support members within the cavity defined thereby.

4. The collapsible hunting blind apparatus according to claim 1 further comprising a tow frame coupled to the floor member, with portions of the tow frame extending from an outer edge of the floor member, a portion of the tow frame defining an axle, having opposing ends, each of the opposing ends having a wheel and a tire coupled thereto, to facilitate towing of the apparatus.

5. The collapsible hunting blind apparatus according to claim 4 wherein the floor member includes a bottom surface, the bottom surface having a plurality of channels formed thereinto to receive the tow frame therein in releasable locked engagement, such that the tow frame is fully contained within the plurality of channels of the bottom surface, with at least some of the channels extending to an outer edge of the floor member allowing portions of the tow frame to extend beyond the outer edge of the floor member.

6. The collapsible hunting blind apparatus according to claim 1 wherein the floor member further comprises a lower member to which the base member having the wall support members is coupled.

7. The collapsible hunting blind apparatus according to claim 1 wherein the tabs are integrally molded with the wall support members.

8. The collapsible hunting blind apparatus according to claim 1 wherein the upper wall of each of the wall support members includes a raised beam extending upwardly from and along the length of the upper wall of each of the wall support members, and being spaced apart from the outer surface of the respective wall support member, with the tabs of each of the wall support members extending upwardly from the raised beam, whereupon placement of the walls in the deployed orientation, the wall overlies the raised beam of the respective wall support member to which the wall is attached.

9. The collapsible hunting blind apparatus according to claim 1 wherein the plurality of walls each being a different height and the plurality of the wall supports member each being a different height such that a shortest wall support member is coupled to a tallest wall and a tallest wall support member is coupled to the shortest wall support.

10. The collapsible hunting blind apparatus according to claim 9 wherein a combination of each one of the wall support members and the corresponding wall attached thereto has an overall height, wherein the overall height of each of the combinations is the same.

11. The collapsible hunting blind apparatus according to claim 1 wherein a door opening is defined in one of the plurality of walls, and a door is hinged along a vertical edge of the door opening via tabs and indents.

12. The collapsible hunting blind apparatus according to claim 11 wherein the door includes an opening into which a sliding shoot port is disposed.

13. The collapsible hunting blind apparatus according to claim 1 wherein at least one of the plurality of walls include an opening into which a window is disposed.

14. The collapsible hunting blind apparatus according to claim 13 wherein the window includes one of a fixed glass and a fixed plexiglass therein.

15. The collapsible hunting blind apparatus according to claim 1 wherein the tabs of the wall support members are flush with the inner edge thereof.

16. The collapsible hunting blind apparatus according to claim 1 wherein the roof member includes angled surfaces that form the top of the roof member, the angled surfaces of the roof member are approximately 30 degrees off of horizontal.

17. The collapsible hunting blind apparatus according to claim 1 wherein the collapsible hunting blind apparatus is approximately 6 feet in length and width, and approximately 19.5 inches in height in a collapsed state.

18. The collapsible hunting blind apparatus according to claim 1 wherein each of the walls includes opposing side edges, with the opposing side edge of each of the walls when in the deployed orientation is proximate an opposing side edge of an adjacent wall, the apparatus further including a corner joint trim spanning between the opposing side edges of the adjacent walls.

19. The collapsible hunting blind apparatus according to claim 18 wherein each corner joint trim extends along the length of the opposing side edges and comprising a flexible material which is releasably coupled to the opposing side edges in releasable securement.

20. The collapsible hunting blind apparatus according to claim 19 wherein the corner joint trim is attached to the opposing side edges through a hook and loop fastener.

* * * * *